(12) United States Patent
Wang et al.

(10) Patent No.: US 12,402,116 B2
(45) Date of Patent: Aug. 26, 2025

(54) SCHEDULING UPLINK TRAFFIC OF STATION

(71) Applicant: Hewlett Packard Enterprise Development LP, Spring, TX (US)

(72) Inventors: Zhenlei Wang, Beijing (CN); Jianpo Han, Beijing (CN); Liao Xu, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 381 days.

(21) Appl. No.: 18/051,191

(22) Filed: Oct. 31, 2022

(65) Prior Publication Data
US 2024/0147457 A1 May 2, 2024

(51) Int. Cl.
| | |
|---|---|
| H04W 72/12 | (2023.01) |
| H04W 28/02 | (2009.01) |
| H04W 72/04 | (2023.01) |
| H04W 72/1268 | (2023.01) |
| H04W 72/23 | (2023.01) |
| H04W 72/566 | (2023.01) |

(52) U.S. Cl.
CPC ... H04W 72/1215 (2013.01); H04W 72/1268 (2013.01); H04W 72/23 (2023.01); H04W 72/569 (2023.01)

(58) Field of Classification Search
CPC ... H04W 72/21; H04W 24/10; H04W 72/569; H04W 72/1268
See application file for complete search history.

(56) References Cited

U.S. PATENT DOCUMENTS

| | | | |
|---|---|---|---|
| 8,233,444 B2 | 7/2012 | Cordeiro et al. | |
| 8,446,825 B2 | 5/2013 | Lee et al. | |
| 9,258,046 B2 | 2/2016 | Sinha | |
| 10,764,784 B2 | 9/2020 | Tanaka et al. | |
| 10,880,865 B2 | 12/2020 | Henry et al. | |
| 10,952,245 B1 | 3/2021 | Smith et al. | |
| 2008/0232260 A1* | 9/2008 | Yeo | H04W 72/52 370/242 |
| 2010/0135166 A1* | 6/2010 | Ahluwalia | H04L 47/263 370/349 |
| 2017/0142017 A1 | 5/2017 | Davis | |
| 2017/0230860 A1 | 8/2017 | Li et al. | |

(Continued)

*Primary Examiner* — Sai Aung
(74) *Attorney, Agent, or Firm* — Hewlett Packard Enterprise Patent Department

(57) ABSTRACT

In implementations of the present disclosure, there is provided an approach for scheduling uplink traffic of a station. A method comprises determining a type of uplink traffic from a station (STA), wherein the type of uplink traffic is associated with a traffic size and an urgency. The method further comprises determining uplink scheduling information for the STA based on the traffic size and the urgency, wherein the uplink scheduling information indicates at least one of: a UL-OFDMA scheduling manner or a UL-MU-MIMO scheduling manner. The method further comprises sending the uplink scheduling information to the STA, and receiving uplink traffic from the STA using the uplink scheduling information. Implementations of the present disclosure can help AP to schedule the STA(s) more intelligent, effective and accurate, and thus the user experience can be enhanced and the transmission performance can be improved.

18 Claims, 12 Drawing Sheets

(56) References Cited

U.S. PATENT DOCUMENTS

| | | | |
|---|---|---|---|
| 2017/0280475 A1* | 9/2017 | Yerramalli | H04W 72/56 |
| 2017/0332385 A1* | 11/2017 | Shirali | H04W 72/569 |
| 2019/0069310 A1 | 2/2019 | Brown et al. | |
| 2019/0320491 A1* | 10/2019 | Shukair | H04B 17/327 |
| 2021/0112626 A1 | 4/2021 | Yi et al. | |
| 2021/0321426 A1* | 10/2021 | Lee | H04W 72/21 |
| 2024/0098733 A1* | 3/2024 | Wang | H04L 1/1812 |
| 2024/0147300 A1* | 5/2024 | Esswie | H04W 28/0268 |

* cited by examiner

SCHEDULING UPLINK TRAFFIC OF STATION

BACKGROUND

Before Wi-Fi 6, an access point (AP) cannot schedule and manage uplink (UL) traffic of stations (STAs), and the STAs may compete for the air interface to transmit the UL traffic based on a random back-off mechanism. The uplink multi-user multiple-input and multiple-out (UL-MU-MIMO) and uplink orthogonal frequency division multiple access (UL-OFDMA) are introduced in Wi-Fi 6, and it is possible for the AP to schedule and manage UL traffic of the STA.

The AP may be aware of a queue size at the STA, such as the number of pending frames, and the AP may schedule the UL traffic of the STA based on the queue size. However, the AP has no idea which scheduling manner may be more suitable, and thus the scheduling solution determined by the AP may not be accurate.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Wi-Fi 5 supports MU-MIMO, but it only supports DL-MU-MIMO up to 4 streams, and Wi-Fi 5 is specified for 5 GHz only but cannot be used in 2.4 GHz. Wi-Fi 6 also supports MU-MIMO, and it can support both DL-MU-MIMO and UL-MU-MIMO up to 8 streams. Additionally, Wi-Fi 6 may be used in 2.4/5/6 GHz band.

Traditionally, the AP may schedule resources based on a buffer status report (BSR) from the STA. For example, the AP may only obtain the number of pending frames at the STA and determine the scheduling resources based on the number of pending frames. However, the AP does not predict any information on the uplink traffic from the STA, and thus the AP cannot determine which scheduling manner is more suitable for the uplink traffic.

Therefore, implementations of the present disclosure propose an approach for scheduling the uplink traffic of an STA. An AP may determine a type of uplink traffic from an STA, where the type of uplink traffic is associated with a traffic size and an urgency of the uplink traffic from the STA. The AP may further determine uplink scheduling information based on the traffic size and the urgency. As such, the STA may transmit the uplink traffic based on the uplink scheduling information.

According to implementations of the present disclosure, the traffic size and the urgency associated with a type of uplink traffic can be used for the AP to determine uplink scheduling information for the STA. As such, the uplink scheduling information may be related to the type of uplink traffic, and thus the scheduling for the uplink traffic may be more intelligent, effective and accurate.

Figure 1A:
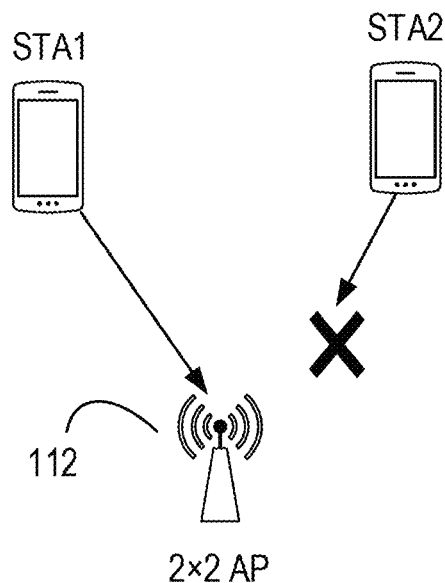
FIGS. 1A-1B illustrate schematic diagrams of SU-MIMO and MU-MIMO respectively.
Figure 1B:
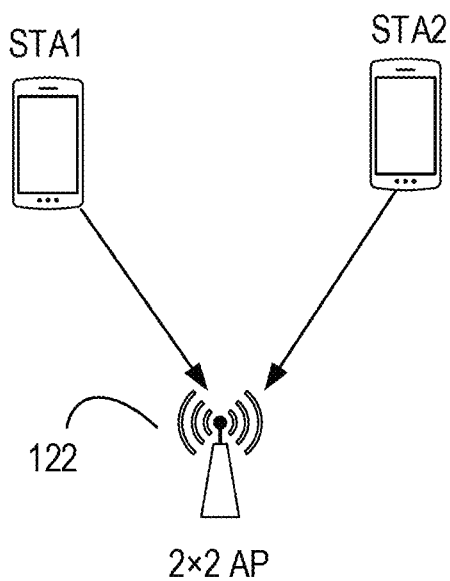

FIGS. 1A-1B illustrate schematic diagrams of SU-MIMO and MU-MIMO respectively. Each of the AP 112 in FIG. 1A and the AP 122 in FIG. 1B is a 2×2 AP, and each of the STA 1 and the STA 2 in FIGS. 1A-1B is a 1×1 STA. As shown in FIG. 1A, the AP 112 can schedule and manage only one STA, STA 1, for example, at a certain time. That is, only one STA can send data to the AP 112 at a time. As shown in FIG. 1B, the AP 122 can schedule and manage at least two STAs including STA 1 and STA 2 simultaneously. That is, both the STA 1 and STA 2 can send data to the AP 122 concurrently at a time.

Wi-Fi 6 also supports OFDMA which is a more efficient technology than OFDM transmission. In OFDMA, the Wi-Fi channel may be broken down into a set of sub-carriers, and 26 sub-carriers may constitute a smallest resource unit (RU), i.e., 26-tone RU. Instead of occupying the entire channel, the UL traffic of an STA may be carried on one or more RUs, so that multiple STAs may transmit in parallel at a same time without queueing and competing. As such, the efficiency may be improved and the latency may be reduced.

Figure 2A:
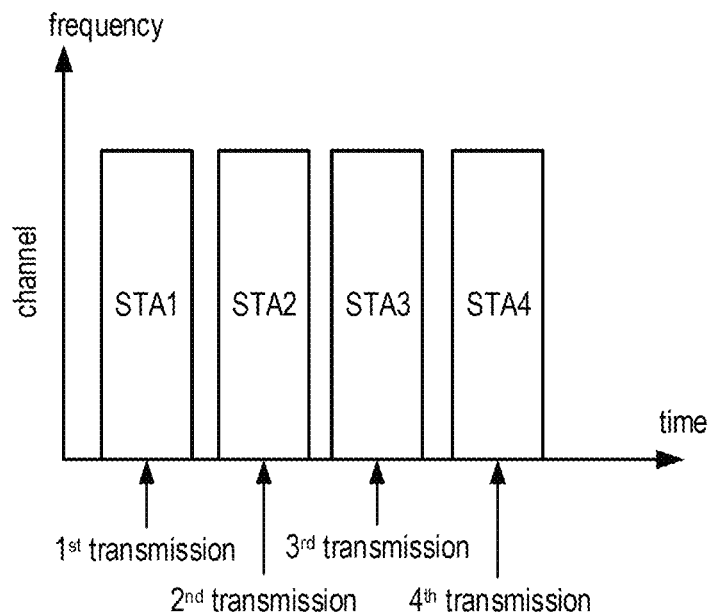
FIGS. 2A-2B illustrate schematic diagrams of OFDM and OFDMA respectively.
Figure 2B:
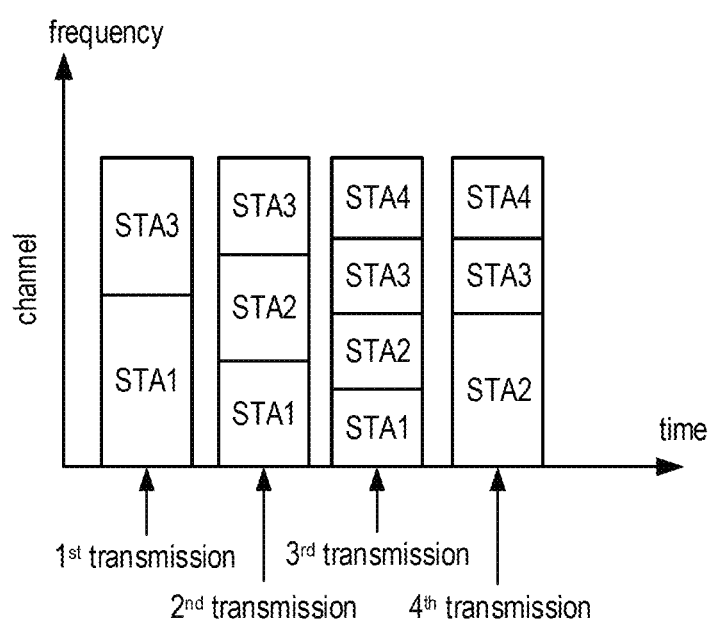

FIGS. 2A-2B illustrate schematic diagrams of OFDM and OFDMA respectively. As shown in FIG. 2A, the traffic of an STA occupies the entire channel at a time. As shown in FIG. 2B, multiple STAs may transmit in parallel at the same time; for example, STA 3 and STA 1 can transmit data at 220 concurrently.

Based on the discussion above, it can be seen that Wi-Fi 6 supports both UL-MU-MIMO and UL-OFDMA to schedule UL traffic of STAs. Table 1 below shows advantages of these two different technologies.

TABLE 1

|  | UL-OFDMA | UL-MU-MIMO |
|---|---|---|
| advantages | improve efficiency<br>reduce latency<br>best for low bandwidth STAs | improve throughout<br>STA has higher rate<br>best for high bandwidth STAs |

TABLE 1-continued

| UL-OFDMA | UL-MU-MIMO |
|---|---|
| best for small packet transmission | best for large packet transmission |

Figure 3:
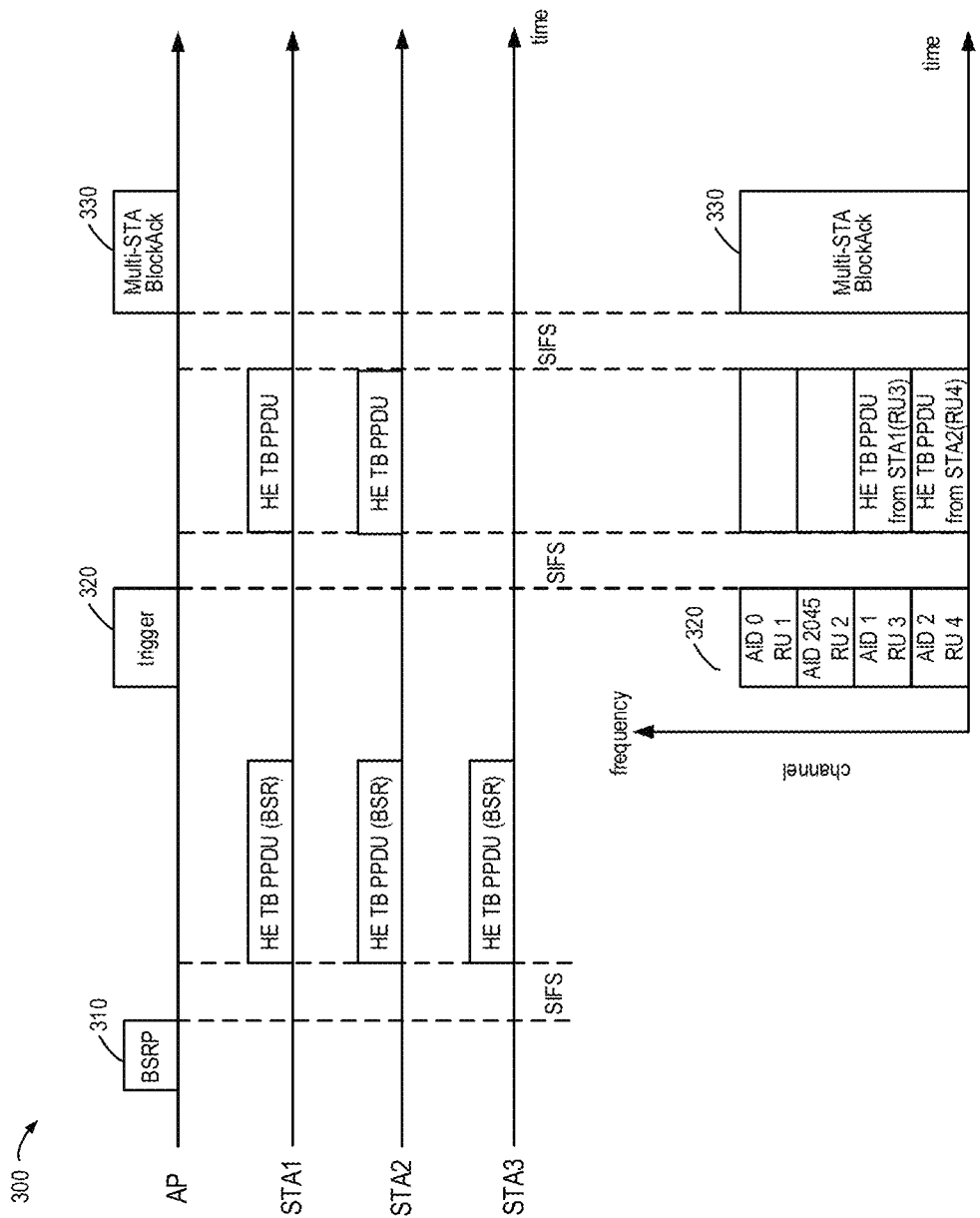
FIG. 3 illustrates an example scheduling process for UL-OFDMA.

FIG. 3 illustrates an example scheduling process 300 for UL-OFDMA. It is assumed that there are three STAs, i.e., STA 1, STA 2, and STA 3. An AP may transmit a buffer status report poll (BSRP) frame 310 to query whether the STAs have buffered frames to be sent to the AP. Each of the STAs may transmit a BSR to the AP, and the BSR may be used for reporting a number of the pending frames at the STA. As shown in FIG. 3, the BSR is carried in a high-efficiency (HE) trigger-based (TB) physical protocol data unit (PPDU). The AP may further transmit a trigger frame 320 to schedule UL traffic from the STAs, the trigger frame 320 is used for allocating RU resources to the STAs. Thus the STAs may transmit the pending frames to the AP, where the pending frames may be carried in another HE TB PPDU.

Specifically, it is assumed that there are pending frames at STA 1 with AID 1 and STA 2 with AID 2, and the AP may obtain the pending frames number at STA 1 and STA 2 respectively. The trigger frame 320 transmitted by the AP may include four RUs: RU1 for AID0, RU2 for AID 2045, RU3 for AID 1, and RU4 for AID 2. The AP may further receive an HE TB PPDU from STA 1 by RU3 and an HE TB PPDU from STA 2 by RU4. A response may be further transmitted by the AP, for example, the response may be implemented as a Multi-STA BlockAck 330.

Based on the process shown in FIG. 3, the AP can obtain a queue size (a number of pending frames) at an STA, and the AP may schedule the UL traffic according to the queue size. As shown in Table 1 above, UL-OFDMA and UL-MU-MIMO have their own advantages, the AP cannot determine which scheduling manner is more suitable only based on the queue size, and thus the scheduling solution determined by the AP may not be accurate.

Therefore, implementations of the present disclosure propose a scheme for scheduling uplink traffic of one or more STAs. In the implementations of the present disclosure, the AP can determine a traffic size and an urgency of uplink traffic of an STA and can further determine a scheduling manner at least based on the traffic size and the urgency. As such, the scheduling performed by the AP may be more intelligent, effective and accurate. For example, the allocated RUs may be more reasonable, and thus the user experience may be enhanced and the transmission performance may be improved.

Other advantages of implementations of the present disclosure will be described with reference to the example implementation as described below. Reference is made below to FIG. 4 through FIG. 12 to illustrate basic principles and several example implementations of the present disclosure herein.

Figure 4:
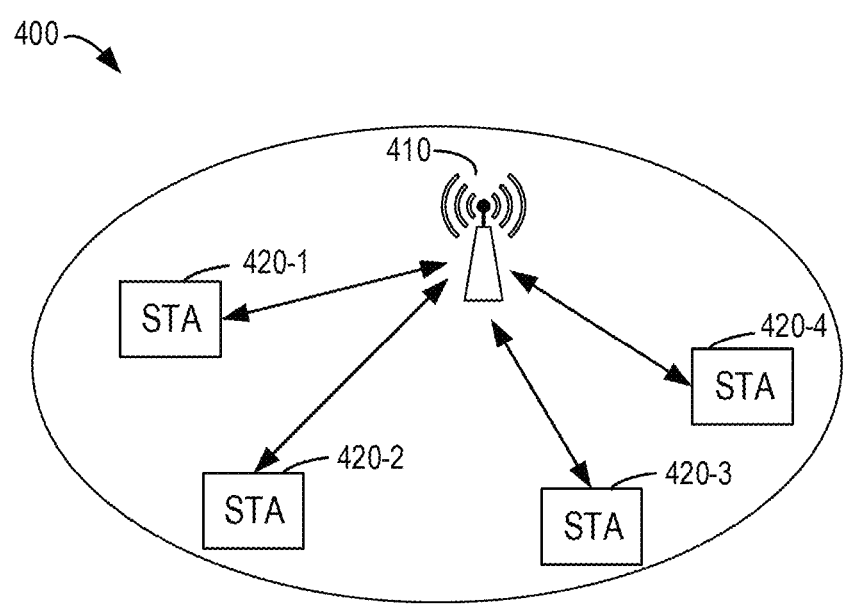
FIG. 4 illustrates an example communication system in which some implementations of the present disclosure can be implemented.

FIG. 4 illustrates an example communication system 400 in which some implementations of the present disclosure can be implemented. The communication system 400 includes an AP 410 and four STAs 420-1 to 420-4, which may be collectively or respectively called an STA 420.

In the system 400, it is assumed that the STA 420 is located within coverage of the AP 410. In some examples, a link from the STA 420 to the AP 410 is referred to as a UL, and a link from the AP to the STA 420 is referred to as a DL.

It is to be understood that the number of devices (i.e., the AP 410 and the STA 420) and their connection relationship and types shown in FIG. 4 are only for the purposes of illustration without suggesting any limitations. The system 400 may include any suitable number of devices adapted for implementing implementations of the present disclosure.

Figure 5:
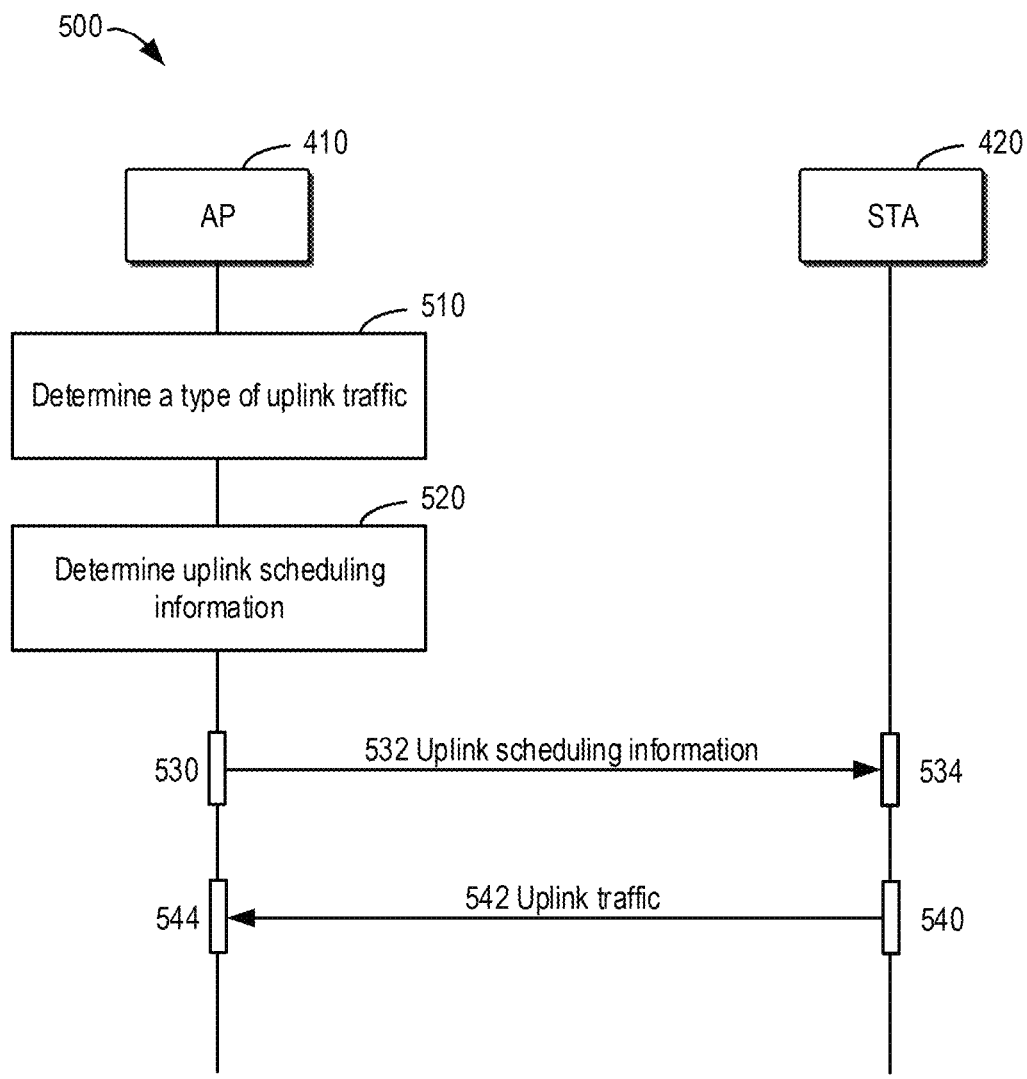
FIG. 5 illustrates a signalling chart illustrating communication process in accordance with some implementations of the present disclosure.

Reference is now made to FIG. 5, which illustrates a signalling chart illustrating communication process 500 in accordance with some implementations of the present disclosure. Only for the purpose of discussion, the process 500 will be described with reference to FIG. 4. The process 500 may involve the AP 410 and the STA 420.

The AP 410 determines 510 a type of uplink traffic from the STA 420. The type of the uplink traffic may be associated with a traffic size of an urgency of the uplink traffic from the STA 420.

In some implementations, the type of uplink traffic may be predicted by the AP 410 for future traffic from the STA 420. In the present disclosure, the type of the uplink traffic may be one or more of: video, voice, game, text, transmission control protocol (TCP) acknowledge (ACK), etc. It is to be understood that the type of the uplink traffic in the present disclosure may also be called a type of UL traffic, a type of traffic, an uplink traffic type, a UL traffic type, a traffic type, etc., and the present disclosure does not limit this aspect. For ease of description, the term "traffic type" will be used in the following disclosure.

In some implementations, the AP 410 may determine a station type of the STA 420 and may further determine the traffic type based on the station type of the STA 420. It is to be understood that the station type in the present disclosure may also be called a device type, a type of a device, a type of the STA, etc., and the present disclosure does not limit this aspect.

In some example implementations, the STA 420 may be an online STA, and the AP 410 may obtain the station type of the STA 420. In some examples, the AP 410 may obtain the station type from device insight or from other device analytic engine. The station type of the STA 420 may be any one of the following types: a conference terminal, a camera device, an internet of things (IoT) device, an augmented reality (AR) device, a virtual reality (VR) device, a mobile phone, a laptop, etc. It is to be understood that the station types listed are described only for the purpose of illustration and help those skilled in the art to understand and implement the present disclosure, without suggesting any limitation as to the scope of the disclosure.

The AP 410 may determine whether the station type of the STA 420 is included in a predetermined set. The predetermined set includes multiple predetermined types each associated with a specific traffic type. In some examples, a predetermined set of station types may be pre-defined based on the association between the station type and the traffic type. For a specific station type, the traffic is relatively simple, for example, the traffic type of the specific station type is fixed, and the specific station type may be added into the predetermined set. As an example, the predetermined set may include: a conference terminal, a camera device, an IoT device, an AR device, and a VR device. It is to be understood that the predetermined set described in the present disclosure is only for the purposes of illustration without suggesting any limitations, for example, the predetermined set may include more station types.

In some examples, if the station type of the STA 420 is included in a predetermined set, the AP 410 may determine the traffic type of the STA 420. In some examples, the AP 410 may determine the traffic type based on the association between the station type and the traffic type. As an example, if the station type is a conference terminal, then the AP 410 may determine that the traffic type is a voice traffic type, or voice for brevity. As another example, if the station type is a camera device, an AR device, or a VR device, then the AP 410 may determine that the traffic type is a video traffic type, or video for brevity. As another example, if the station type is an IoT device, then the AP 410 may determine that the traffic type is a text traffic type, or text for brevity. As a specific example, the association may be shown below in Table 2.

TABLE 2

| station type | traffic type |
| --- | --- |
| conference terminal | voice |
| camera device | video |
| IoT device | text |
| AR device | video |
| VR device | video |

In some other examples, if the station type of the STA 420 is not included in the predetermined set, the AP 410 may determine the traffic type of the STA 420 from multiple types of uplink traffic of the STA 420. For example, the station type may be a mobile device or a laptop. A mobile device or a laptop may associate with multiple types of uplink traffic, for example, multiple application programs are run on the mobile device or the laptop.

In some examples, the AP may determine main traffic from multiple types of uplink traffic, and takes the type of the main traffic as the determined traffic type. Specifically, the AP 410 may determine the main traffic by using a deep packet inspection (DPI) method. In some examples, the AP 410 may determine the main traffic by using other methods and the present disclosure will not list herein.

As described above, the type of the uplink traffic (i.e., the traffic type) may be associated with a traffic size of an urgency of the uplink traffic. Additionally or alternatively, the AP 410 may determine the traffic size of the urgency based on the traffic type.

For example, if the traffic type is a video, the AP 410 may determine that the traffic size is larger than a threshold size and the urgency is higher than a threshold level. For example, if the traffic type is a voice, the AP 410 may determine that the traffic size is smaller than the threshold size and the urgency is higher than the threshold level. For example, if the traffic type is a text, the AP 410 may determine that the traffic size is smaller than the threshold size and the urgency is lower than the threshold level.

In the present disclosure, the traffic size larger than a threshold size may be referred to as a large size, a large frame, a large size of frames, etc., and the traffic size smaller than the threshold size may be referred to as a small size, a small frame, a small size of frames, etc. In the present disclosure, the urgency higher than the threshold level may be referred to as a high urgency, a high priority, a low latency, etc., and the urgency lower than the threshold level may be referred to as a low urgency, a low priority, a high latency, etc.

As such, the AP can obtain a station type of an STA, and determine whether the station type is included in a predetermined set. The AP may further determine a type of uplink traffic from the STA, where the type of uplink traffic is associated with the station type if the station type is included in the predetermined set or the type of uplink traffic is a type of main traffic from multiple types of uplink traffic of the STA if the station type is not included in the predetermined set. Additionally, the AP may determine a traffic size and an urgency of uplink traffic of the STA based on the type of uplink traffic.

Continue referring to FIG. 5, the AP 410 determines 520 uplink scheduling information for the STA 420 based on the traffic size and the urgency associated with the type of uplink traffic. The uplink scheduling information may indicate a scheduling manner which may be one of a UL-OFDMA scheduling manner, a UL-MU-MIMO scheduling manner, or an uplink OFDMA random access (UORA) scheduling manner.

In some implementations, the uplink scheduling information may indicate uplink transmission resources which can be used by the STA 420, where the uplink transmission resources may include the scheduling manner and multiple RUs. In some examples, the AP 410 may further determine a number of RUs for the STA 420. And the uplink scheduling information may further indicate the number of RUs, where the number of RUs will be used by the STA 420 for uplink transmission.

For example, if the traffic size is large and the urgency is high, the AP 410 may determine that the scheduling manner is the UL-OFDMA scheduling manner for the STA 420 and the AP 410 may allocate more RUs to the STA 420. For example, if the traffic size is small and the urgency is low, the AP 410 may determine that the scheduling manner is the UL-OFDMA scheduling manner for the STA 420 and the AP 410 may allocate little RUs to the STA 420.

In some implementations, the AP 410 may further consider the number of STAs while determining the uplink scheduling information. In some examples, if there are multiple STAs with the same traffic size and the same urgency, the AP 410 may allocate the transmission resource (such as RUs) to the multiple STAs based on the same traffic size, the same urgency, and the number of the multiple STAs.

For example, if there are multiple STAs each has a large traffic size and a high urgency, the AP 410 may determine that the scheduling manner is the UL-MU-MIMO scheduling manner for the multiple STAs, and the AP 410 may allocate more RUs to each of the multiple STAs. For example, if there are multiple STAs each has a small traffic size and a low urgency, and if the RU is in short supply, then the AP 410 may determine that the scheduling manner is the UORA scheduling manner, and the AP 410 may allocate little RUs to each of the multiple STAs.

Continue referring to FIG. 5, the AP 410 sends 530 the uplink scheduling information 532 to the STA 420. Accordingly, the STA 420 receives 534 the uplink scheduling information 532 from the AP 410.

The STA 420 transmits 540 the uplink traffic 542 based on the uplink scheduling information 532. Accordingly, the AP 410 receives 544 the uplink traffic 542 from the STA 420.

Figure 6:
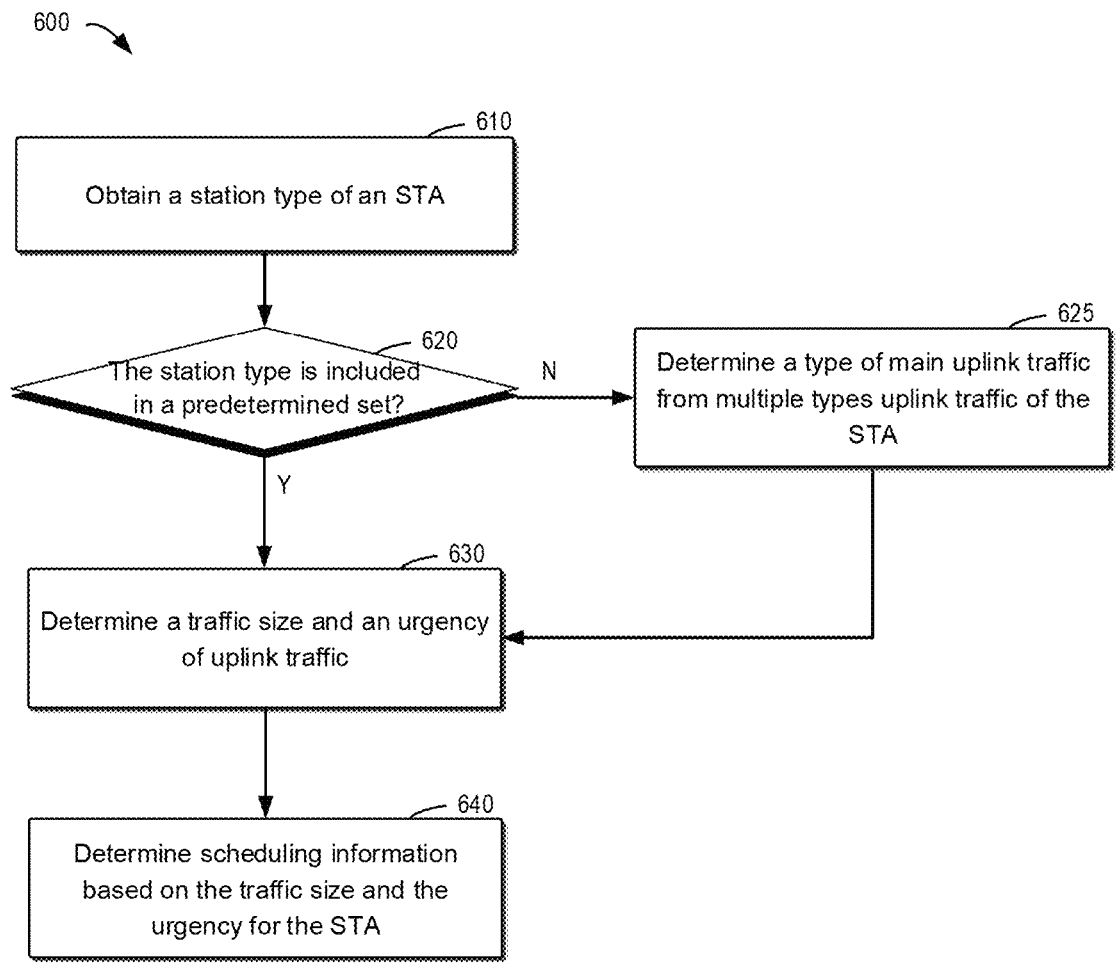
FIG. 6 illustrates a flow chart of an example method for determining uplink scheduling information in accordance with some implementations of the present disclosure.

Reference now is further made to FIG. 6, which illustrates a flow chart of an example method 600 for determining uplink scheduling information in accordance with some implementations of the present disclosure. The method 600 may be performed by an AP, such as the AP 410 as shown in FIG. 4.

At 610, the AP 410 obtains a station type of an STA, such as the STA 420 in FIG. 4. At 620, the AP 410 determines whether the station type is included in a predetermined set. At 625, if the station type is not included in the predetermined set, the AP 410 determines a type of main uplink traffic from multiple types of uplink traffic of the STA. At 630, the AP 410 determines a traffic size and an urgency of uplink traffic of the STA. At 640, the AP 410 determines scheduling information based on the traffic size and the urgency for the STA.

In some implementations, if the AP 410 determines that the station type is included in the predetermined set at 620, the AP 410 may determine the traffic size and the urgency based on the station type at 630.

In some examples, there may be an association of the station type in the predetermined set with the traffic size and the urgency. For example, if the station type is a camera device (or an AR device or a VR device) in the predetermined set, the AP 410 may determine that the traffic size is larger than a threshold size and the urgency is higher than a threshold level. For example, if the station type is a conference terminal in the predetermined set, the AP 410 may determine that the traffic size is smaller than the threshold size and the urgency is higher than the threshold level. For example, if the station type is an IoT device in the predetermined set, the AP 410 may determine that the traffic size is smaller than the threshold size and the urgency is lower than the threshold level. As an example, the association may be shown below in Table 3.

TABLE 3

| station type | traffic size and urgency | |
|---|---|---|
| | traffic size | urgency |
| conference terminal | small | high |
| camera device | large | high |
| IoT device | small | low |
| AR device | large | high |
| VR device | large | high |

In some examples, if the station type is included in the predetermined set, the AP 410 may determine the uplink scheduling information further based on a number of STAs with the same station type, where the uplink scheduling information may indicate a scheduling manner and a number of RUs.

For example, if there is only one STA which is a camera (in the predetermined set), the AP 410 may determine that the scheduling manner is the UL-OFDMA scheduling manner for the STA and the AP 410 may allocate more RUs to the STA. For example, if there are multiple STAs which are cameras (in the predetermined set), the AP 410 may determine that the scheduling manner is the UL-MU-MIMO scheduling manner for the multiple STAs, and the AP 410 may allocate more RUs to each of the STAs.

For example, if there is only one STA which is an IoT device (in the predetermined set), the AP 410 may determine that the scheduling manner is the UL-OFDMA scheduling manner for the STA and the AP 410 may allocate little RUs to the STA. For example, if there are multiple STAs which are IoT devices (in the predetermined set) and the RU is in short supply, the AP 410 may determine that the scheduling manner is the UORA scheduling manner and may allocate little RUs to each of the STAs.

As such, since the station type included in the predetermined set is associated with a simple traffic, the traffic size and urgency of the uplink traffic may be determined based on the station type. Accordingly, the scheduling manner may be determined at the AP 410 for the STA.

In some implementations, if the AP 410 determines that the station type is not included in the predetermined set at 620, the AP 410 may determine a type of main uplink traffic at 625, and further determine the traffic size and the urgency based on the type of main uplink traffic at 630.

For example, if the type of main uplink traffic is a video or a game, the AP 410 may determine that the traffic size is larger than a threshold size and the urgency is higher than a threshold level. For example, if the type of main uplink traffic is a voice, the AP 410 may determine that the traffic size is smaller than the threshold size and the urgency is higher than the threshold level. For example, if the type of main uplink traffic is a TCP ACK, the AP 410 may determine that the traffic size is smaller than the threshold size and the urgency is lower than the threshold level.

In some examples, the uplink scheduling information may indicate a scheduling manner and a number of RUs. If the station type is not included in the predetermined set, the AP 410 may analyze to determine the type of main traffic of the STA 420, allocate a number of RUs to the STA 420 and schedule in a scheduling manner. In some examples, if the station type is not included in the predetermined set, the AP 410 may determine the uplink scheduling information further based on a number of STAs with a same type of main uplink traffic.

As such, since the station type is not included in the predetermined set, a type of main uplink traffic may be determined by analyzing using a DPI method; and the traffic size and urgency of the uplink traffic may be determined based on the type of the main uplink traffic. Accordingly, the uplink scheduling information may be determined at the AP for the STA.

For example, if the type of main uplink traffic is a video, the traffic size is large and the urgency is high, the AP 410 may determine that the scheduling manner is the UL-MU-MIMO scheduling manner for the STA and the AP 410 may allocate more RUs to the STA. For example, if the type of main uplink traffic is a voice, the traffic size is small and the urgency is high, the AP 410 may determine that the scheduling manner is the UL-DFDMA scheduling manner for the STA and the AP 410 may allocate little RUs to the STA. For example, if the type of main uplink traffic is a TCP ACK, the traffic size is small and the urgency is low, the AP 410 may determine that the scheduling manner is the UORA scheduling manner for the STA and the AP 410 may allocate little RUs to the STA.

According to implementations described with reference to FIG. 6, the traffic size and the urgency can be determined based on a station type, and can be used for the AP to schedule the uplink transmission of the STA. For an STA of a specific station type, the traffic is simple, and the traffic size and the urgency may be determined based on the station type of the STA. For an STA with multiple types of uplink traffic, a type of main traffic may be determined and the traffic size and the urgency may be predicted accordingly. Since a station type is considered, the predicted traffic size and urgency can be more accurate, and accordingly, the scheduling for the uplink traffic may be more intelligent, effective and accurate.

Figure 7:
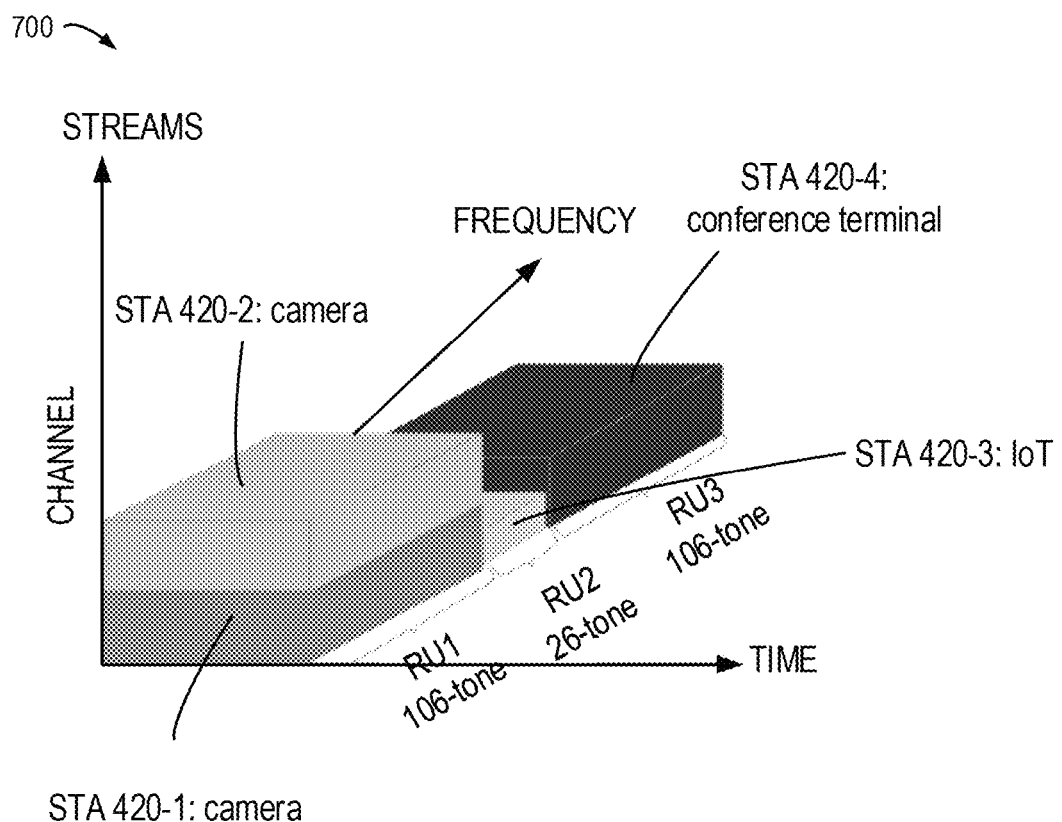
FIG. 7 illustrates a schematic diagram of scheduling UL traffic of four STAs based on the station types of the STAs in accordance with some implementations of the present disclosure.

FIG. 7 illustrates a schematic diagram 700 of scheduling UL traffic of four STAs based on the station types of the STAs in accordance with some implementations of the present disclosure. As shown in FIG. 7, there are STA 420-1 through STA 420-4, and it is assumed that STA 420-1 is a camera, STA 420-2 is a camera, STA 420-3 is an IoT device, and STA 420-4 is a conference terminal.

The AP 410 may allocate RU1 (106-tone) to STA 420-1 and STA 420-2 and schedule with UL-MU-MIMO. The AP 410 may allocate RU2 (26-tone) to STA 420-3 and schedule with UL-OFDMA. The AP 410 may allocate RU3 (106-tone) to STA 420-4 and schedule with UL-MU-MIMO.

Figure 8:
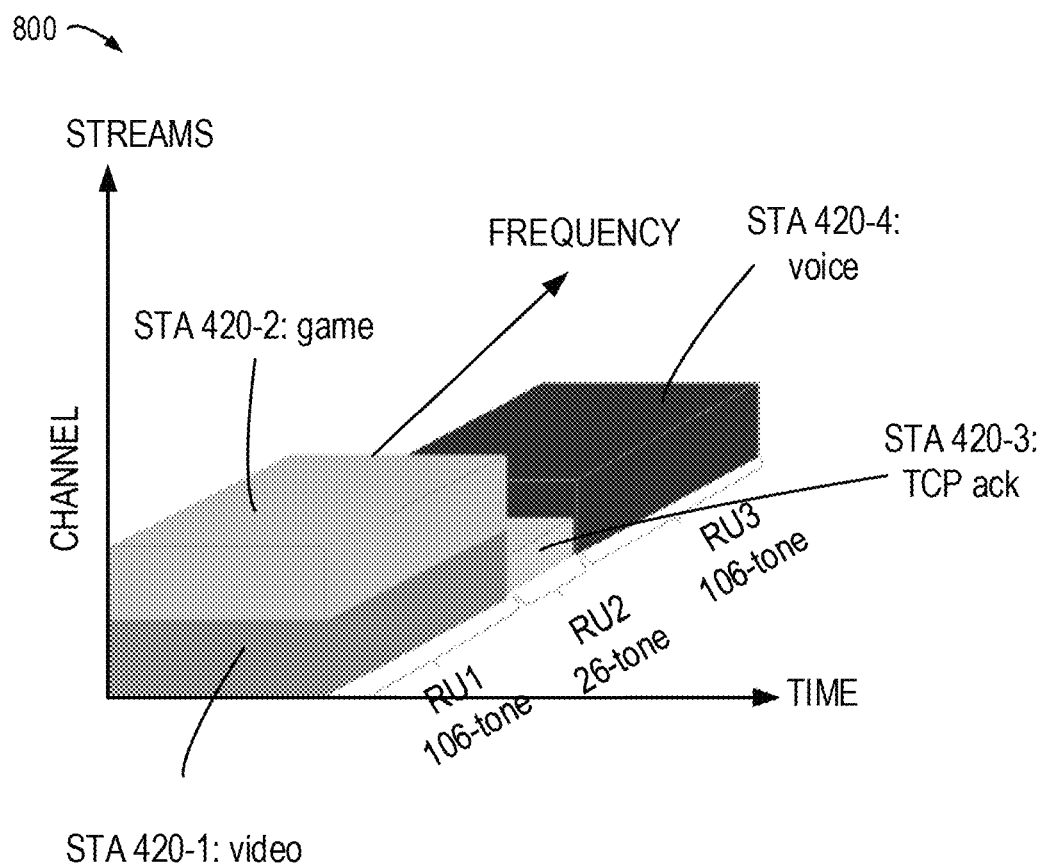
FIG. 8 illustrates a schematic diagram of scheduling UL traffic of four STAs based on the traffic types of the STAs in accordance with some implementations of the present disclosure.

FIG. 8 illustrates a schematic diagram 800 of scheduling UL traffic of four STAs based on the types of uplink traffic of the STAs in accordance with some implementations of the present disclosure. As shown in FIG. 8, there are STA 420-1 through STA 420-4, and it is assumed that STAs 420-1, 420-2 and 420-4 are mobile phones and STA 420-3 is a laptop.

The AP 410 may determine that the type of main uplink traffic of the STA 420-1 is a video, the type of main uplink traffic of the STA 420-2 is a game, the type of main uplink traffic of the STA 420-3 is a TCP ACK, and the type of main uplink traffic of the STA 420-4 is a voice. The AP 410 may allocate RU1 (106-tone) to STA 420-1 and STA 420-2 and schedule with UL-MU-MIMO. The AP 410 may allocate RU2 (26-tone) to STA 420-3 and schedule with UL-OFDMA. The AP 410 may allocate RU3 (106-tone) to STA 420-4 and schedule with UL-MU-MIMO.

Figure 9:
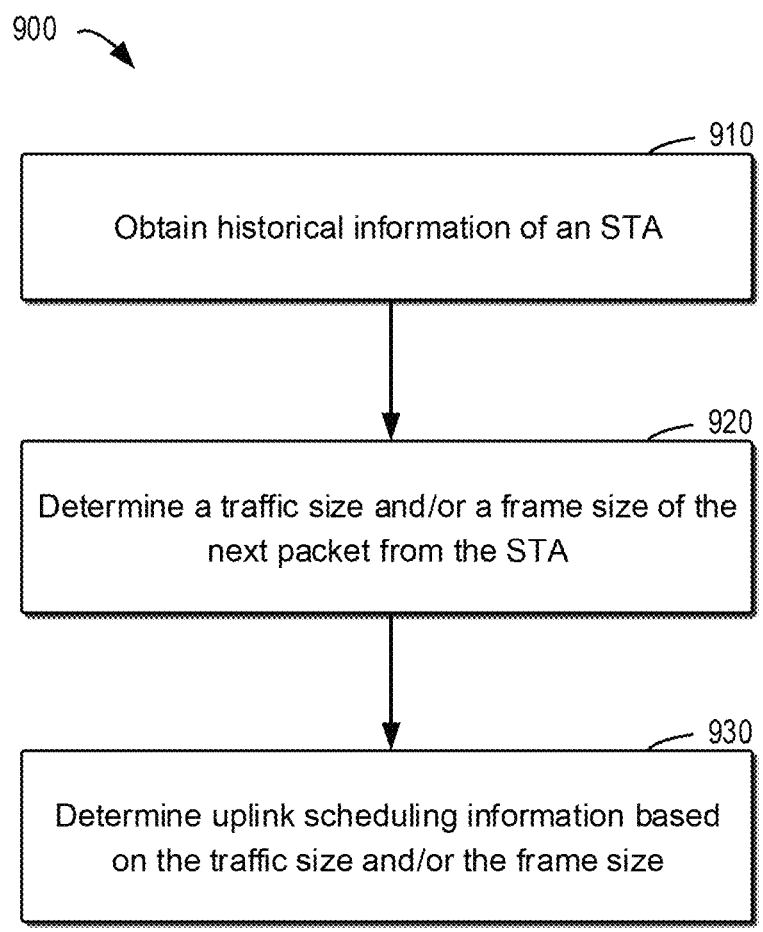
FIG. 9 illustrates a flow chart of another example method for determining uplink scheduling information in accordance with some implementations of the present disclosure.

Reference now is further made to FIG. 9, which illustrates a flow chart of another example method 900 for determining uplink scheduling information in accordance with some implementations of the present disclosure. The method 900 may be performed by an AP, such as the AP 410 as shown in FIG. 4.

At 910, the AP 410 obtains historical information of an STA, such as the STA 420 in FIG. 4. At 920, the AP 410 determines a traffic size and/or a frame size of the next packet from the STA. At 930, the AP 410 determines uplink scheduling information based on the traffic size and/or the frame size.

Additionally or alternatively, the AP 410 may transmit the uplink scheduling information to the STA, and the STA may transmit its next packet to the AP 410 based on the uplink scheduling information. For example, the uplink scheduling information may indicate a scheduling manner and a number of RUs In some implementations, the historical information may indicate at least one of: historical packet size distribution, historical RUs usage, historical transmission time, or historical scheduling manner. In some implementations, the traffic size may refer to a size of the uplink traffic, and the frame size may refer to a size of data packet in a frame. In some examples, the traffic size may be larger than the frame size.

In some examples, the AP 410 may determine the latest information of the latest transmission based on the historical information, and the AP 410 may further determine one or more of the traffic size or the frame size of the next packet based on the latest information. For example, if the latest information indicates that the latest transmission is performed at a first time, and a time length from the first time to the current time is shorter than a predefined duration threshold, the AP 410 may predict that the next packet may be with the same traffic size or the same frame size as the latest transmission.

In some examples, if the historical information indicates that the historical packet size distribution is regular, then the AP 410 may determine a traffic size and/or a frame size of the STA 420 based on historical information of the STA 420. For example, if the historical information indicates that the recent traffic size is large and the recent frame size is large, the AP 410 may predict that the next packet of the STA 420 is still large. For example, the AP 410 may determine the traffic size and/or the frame of following packets of the STA 420 by using a Markovian model or a machine learning model.

In the present disclosure, the large traffic size may represent that a traffic size is larger than a first threshold size, and the large frame size may represent that a frame size is larger than a second threshold size. In the present disclosure, the small traffic size may represent that a traffic size is smaller than the first threshold size, and the small frame size may represent that a frame size is smaller than the second threshold size.

The AP 410 may further determine a scheduling manner based on the traffic size and/or the frame size of the STA 420. Additionally or alternatively, the AP 410 may further determine the number of RUs for the STA 420.

In some other implementations, the AP 410 may obtain historical information of the STA 420, and further determine uplink scheduling information based on the historical information. In some examples, if the historical information indicates that the historical packet size distribution is random, then the AP 410 may determine the scheduling manner for the STA 420 is the UORA scheduling manner. Since the historical packet size distribution is random, the AP 410 may be unable to predict the size of the next packet. In this case, a UORA scheduling manner may be used. For example, the AP 410 may mark multiple continuous RUs as a random access in the trigger frame, and thus the STA 420 may determine how many RUs to be used by itself from the multiple continuous RUs in the trigger frame.

In some example implementations, if the AP 410 is unable to determine the station type of the STA 420 or the AP 410 is unable to determine the type of uplink traffic from the STA 420, then the AP 410 may determine uplink scheduling information based on historical information of the STA 420.

Figure 10:
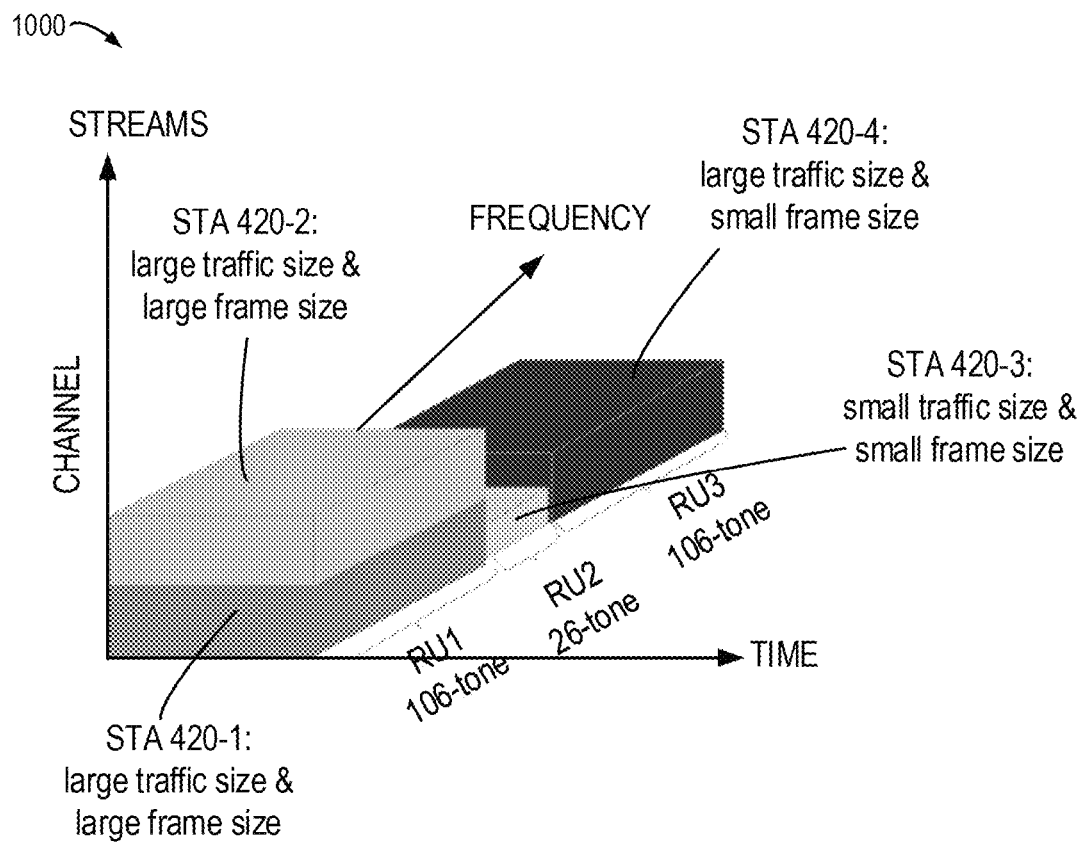
FIG. 10 illustrates a schematic diagram of scheduling UL traffic of four STAs based on historical information in accordance with some implementations of the present disclosure.

FIG. 10 illustrates a schematic diagram 1000 of scheduling UL traffic of four STAs based on historical information in accordance with some implementations of the present disclosure. As shown in FIG. 10, there are STA 420-1 through STA 420-4, and it is assumed that the AP 410 is unable to determine the station types or types of uplink traffic of these STAs.

In some examples, the AP 410 may predict the traffic size and frame size for each of the STAs 420-1 to 420-4 based on historical information of each of the STAs 420-1 to 420-4. For example, it is assumed that the AP 410 predicts that STA 420-1 will have large traffic size and large frame size, STA 420-2 will have large traffic size and large frame size, STA 420-3 will have small traffic size and small frame size, and STA 420-4 will have large traffic size and small frame size. The AP 410 may allocate RU1 (106-tone) to STA 420-1 and STA 420-2 and schedule with UL-MU-MIMO. The AP 410 may allocate RU2 (26-tone) to STA 420-3 and schedule with UL-OFDMA. The AP 410 may allocate RU3 (106-tone) to STA 420-4 and schedule with UL-MU-MIMO.

Figure 11:
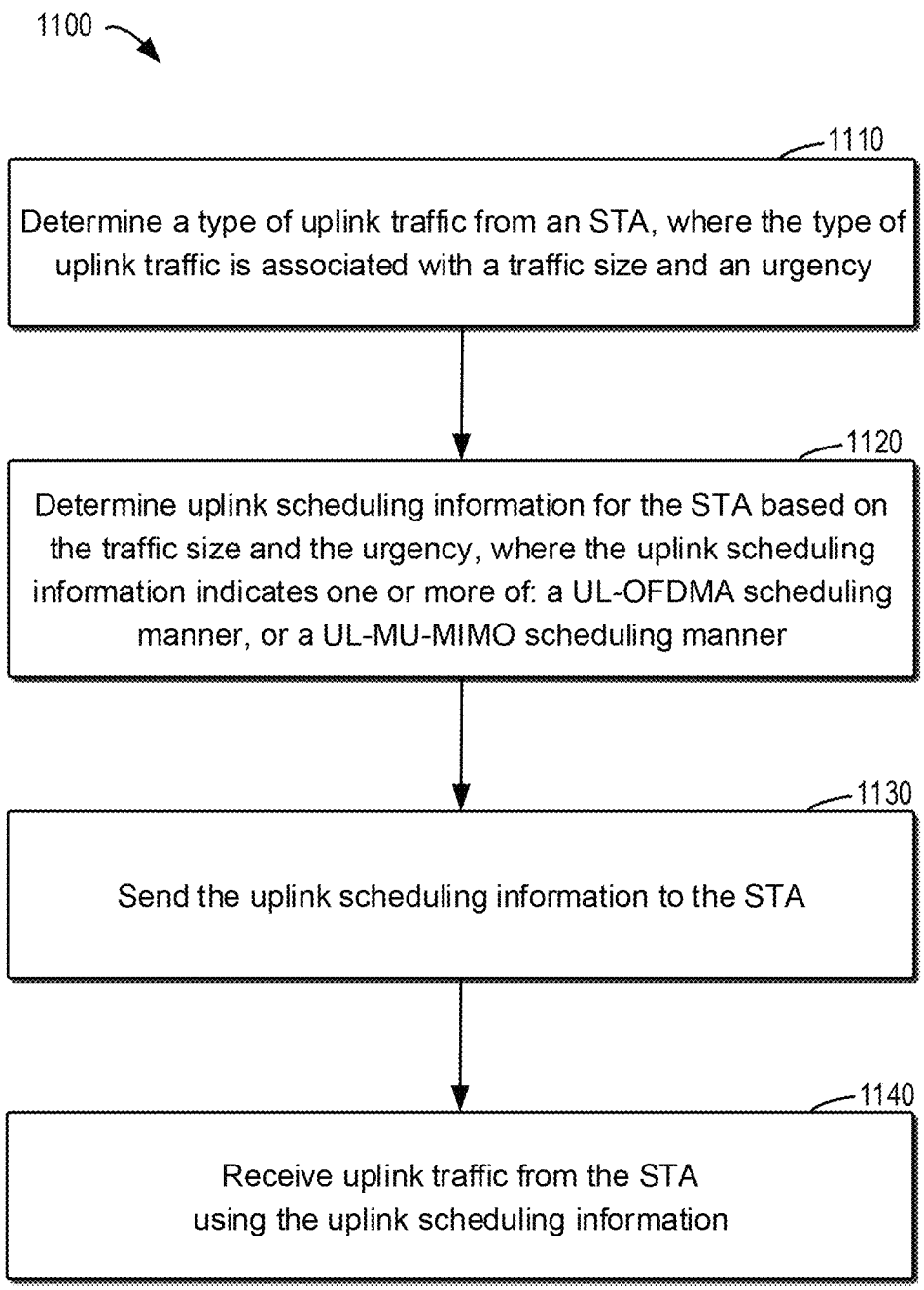
FIG. 11 illustrates a flow chart of an example method for scheduling UL traffic of the STA in accordance with some implementations of the present disclosure.

FIG. 11 illustrates a flow chart of an example method 1100 for scheduling UL traffic of the STA in accordance with some implementations of the present disclosure. The method 1100 may be performed by an AP, such as the AP 410 as shown in FIG. 4.

At 1110, the AP 410 determines a type of uplink traffic from an STA, where the type of uplink traffic is associated with a traffic size and an urgency. At 1120, the AP determines uplink scheduling information for the STA based on the traffic size and the urgency, where the uplink scheduling information indicates one or more of: a UL-OFDMA scheduling manner, or a UL-MU-MIMO scheduling manner. At 1130, the AP 410 sends the uplink scheduling information to the STA. At 1140, the AP 410 receives uplink traffic from the STA using the uplink scheduling information.

In some implementations, the AP 410 may obtain a station type of the STA, and then determine the type of uplink traffic based on the station type. For example, the AP 410 obtains the station type of the STA from a device insight or from a device analytic engine. Since the type of uplink traffic is associated with the traffic size and the urgency, the AP 410 may further determine the traffic size and the urgency.

Specifically, the AP 410 may determine whether the station type is included in a predetermined set. In some examples, if the station type is included in the predetermined set, the AP 410 may determine the type of uplink traffic based on an association between the station type and the type of uplink traffic. In some examples, the predetermined set may include one or more of: a conference terminal, a camera device, an IoT device, an AR device, and a VR device.

For example, if the station type is a camera device (or an AR device or a VR device), the type of uplink traffic may be a video, and the AP 410 may determine that the traffic size is larger than a threshold size and the urgency is higher than a threshold level. For example, if the station type is a conference terminal, the type of uplink traffic may be a voice, and the AP 410 may determine that the traffic size is smaller than the threshold size and the urgency is higher than the threshold level. For example, if the station type is an IoT device, the type of uplink traffic may be a text, and the AP 410 may determine that the traffic size is smaller than the threshold size and the urgency is lower than the threshold level.

In some other examples, if the station type is not included in the predetermined set, the AP 410 may determine the type of uplink traffic from multiple types of uplink traffic of the STA. For example, the AP 410 may determine main traffic of the STA by using a deep packet inspection, and accordingly the type of the main traffic can be determined. The AP 410 can take the type of the main traffic as the type of uplink traffic.

In some implementations, the AP 410 may determine that the scheduling manner is the UL-MU-MIMO scheduling manner if the traffic size is larger than a threshold size and the urgency is higher than a threshold level. In some other implementations, the AP 410 may determine that the scheduling manner is the UL-OFDMA scheduling manner if the traffic size is smaller than a threshold size and the urgency is higher than a threshold level. In some other implementations, the AP 410 may determine that the scheduling manner is the UORA scheduling manner if the urgency is lower than a threshold level.

In some examples, the AP 410 may further consider the number of STAs while determining the scheduling manner. In some examples, the uplink scheduling information may further indicate a number of RUs, and the AP 410 may further determine the number of RUs for the STA 420.

In some example implementations, the AP 410 determines further uplink scheduling information for a further STA based on historical information of the further STA, where the further uplink scheduling information indicates at least one of: a UL-OFDMA scheduling manner, a UL-MU-MIMO scheduling manner, or a UORA scheduling manner.

In some implementations, if the AP 410 fails to determine a further type of uplink traffic from the further STA, it can determine a traffic size and/or a frame size based on historical information of the further STA. And the AP 410 may determine the further uplink scheduling information based on the traffic size and/or the frame size.

In some examples, the historical information may indicate a historical packet distribution, and the AP 410 may determine the traffic size and/or the frame size based on the historical packet distribution. For example, if the historical information indicates that a packet distribution is regular, the AP 410 may determine the traffic size and/or the frame size of a following packet of the STA, i.e., the next packet from the STA. In some other examples, if the historical information indicates that a packet distribution is random, the AP 410 may determine that the further uplink scheduling information indicates a UORA scheduling manner.

Figure 12:
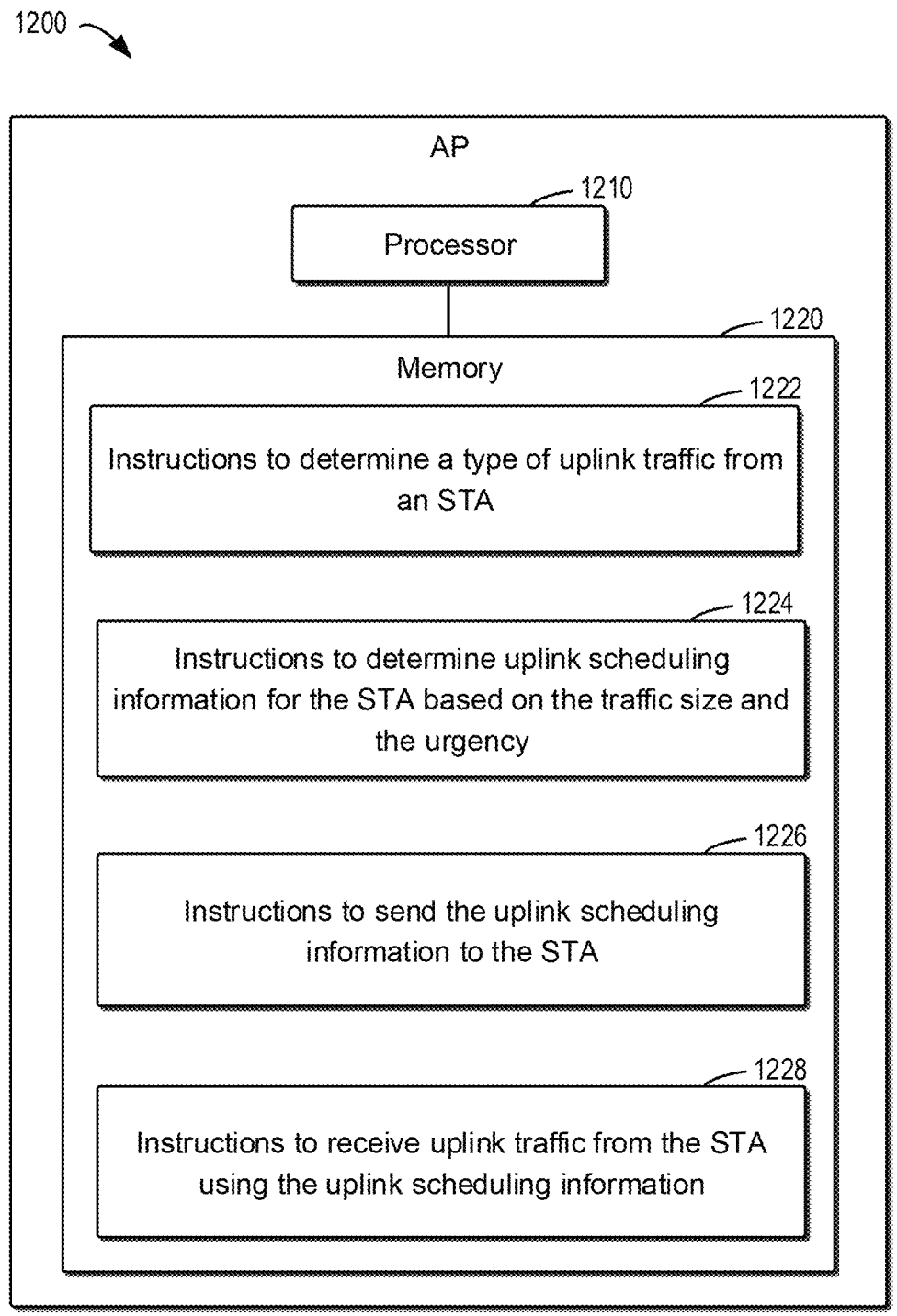
FIG. 12 illustrates an example AP in accordance with some implementations of the present disclosure.

FIG. 12 illustrates an example AP 1200 according to implementations of the present disclosure. As shown in FIG. 12, the AP 1200 comprises at least one processor 1210 and a memory 1220 coupled to the processor 1210. The memory 1220 stores instructions 1222, 1224, 1226, and 1228 to cause the processor 1210 to perform actions according to implementations of the present disclosure.

As shown in FIG. 12, the memory 1220 stores instructions 1222 to determine a type of uplink traffic from an STA, where the type of uplink traffic is associated with a traffic size and an urgency. The memory 1220 further stores instructions 1224 to determine uplink scheduling information for the STA based on the traffic size and the urgency, where the uplink scheduling information indicates one or more of a UL-OFDMA scheduling manner, or a UL-MU-MIMO scheduling manner. The memory 1220 further stores instructions 1226 to send the uplink scheduling information to the STA. The memory 1220 further stores instructions 1228 to receive uplink traffic from the STA using the uplink scheduling information.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
   determining, at an access point (AP), a type of uplink traffic from a station (STA), wherein the type of uplink traffic is associated with a traffic size and an urgency;
   determining, by the AP and for the STA, uplink scheduling information based on the traffic size and the urgency, wherein determining the uplink scheduling information comprises:
   in accordance with a determination that the traffic size is larger than a threshold size and the urgency is higher than a threshold level, determining that a scheduling manner is an uplink multiple user multiple input multiple output (UL-MU-MIMO) scheduling manner, or
   in accordance with a determination that the traffic size is smaller than a threshold size and the urgency is higher than a threshold level, determining that a scheduling manner is an uplink orthogonal frequency division multiple access (UL-OFDMA) scheduling manner;
   sending, by the AP to the STA, the uplink scheduling information; and
   receiving, by the AP from the STA, uplink traffic using the uplink scheduling information.

2. The method according to claim 1, further comprising:
   obtaining a station type of the STA; and
   determining the type of uplink traffic based on the station type.

3. The method according to claim 2, wherein determining the type of uplink traffic based on the station type comprises;
   determining whether the station type is included in a predetermined set; and
   in accordance with a determination that the station type is included in the predetermined set, determining the type of uplink traffic based on an association between the station type and the type of uplink traffic; or
   in accordance with a determination that the station type is not included in the predetermined set, determining the type of uplink traffic from a plurality of types of uplink traffic of the STA.

4. The method according to claim 3, wherein the predetermined set comprises at least one of:
   a conference terminal,
   a camera device,
   an internet-of-things (IoT) device,
   an augment reality (AR) device, or
   a virtual reality (VR) device.

5. The method according to claim 3, wherein determining the type of uplink traffic based on an association between the station type and the type of uplink traffic comprises:
   in accordance with a determination that the station type is a conference terminal, determining that the type of uplink traffic is a voice,
   in accordance with a determination that the station type is one of a camera device, an AR device or a VR device, determining that the type of uplink traffic is a video, or
   in accordance with a determination that the station type is an IoT device, determining that the type of uplink traffic is a text.

6. The method according to claim 3, wherein determining the type of uplink traffic from a plurality of types of uplink traffic of the STA comprises:
   determining a type of main traffic of the STA as the type of uplink traffic by using a deep packet inspection.

7. The method according to claim 2, wherein obtaining the station type of the STA comprises:
   obtaining the station type of the STA from a device insight or from a device analytic engine.

8. The method according to claim 1, further comprising:
   in accordance with a determination that the type of uplink traffic is a video, determining that the traffic size is larger than a threshold size and the urgency is higher than a threshold level,
   in accordance with a determination that the type of uplink traffic is a voice, determining that the traffic size is smaller than a threshold size and the urgency is higher than a threshold level, or
   in accordance with a determination that the type of uplink traffic is a text, determining that the traffic size is smaller than a threshold size and the urgency is lower than a threshold level.

9. The method according to claim 1, wherein the uplink scheduling information further indicates an uplink OFDMA random access (UORA) scheduling manner, and wherein determining the uplink scheduling information comprises:
   in accordance with a determination that the urgency is lower than a threshold level, determining that the scheduling manner is the UORA scheduling manner.

10. The method according to claim 1, wherein the uplink scheduling information further indicates a number of resource units.

11. The method according to claim 1, further comprising:
    determining further uplink scheduling information for a further STA based on historical information of the further STA, wherein the further uplink scheduling information indicates at least one of: a UL-OFDMA scheduling manner, a UL-MU-MIMO scheduling manner, or a UORA scheduling manner.

12. The method according to claim 11, wherein determining further uplink scheduling information for the further STA based on historical information comprises:
    in accordance with a determination that the historical information indicates a packet distribution is regular, determining at least one of a traffic size or a frame size of a following packet of the STA; and
    determining the further uplink scheduling information based on at least one of the traffic size or the frame size, wherein the further uplink scheduling information indicates at least one of the UL-OFDMA scheduling manner or the UL-MU-MIMO scheduling manner.

13. The method according to claim 11, wherein determining further uplink scheduling information for the further STA based on historical information comprises:
    in accordance with a determination that the historical information indicates that a packet distribution is random, determining that the further uplink scheduling information indicates a UORA scheduling manner.

14. An access point (AP) comprising:
    at least one processor; and a memory coupled to the at least one processor, the memory storing instructions to cause the at least one processor to:
  determine a type of uplink traffic from a station (STA), wherein the type of uplink traffic is associated with a traffic size and an urgency;
  determine, for the STA, uplink scheduling information based on the traffic size and the urgency, wherein determining the uplink scheduling information comprises:
  in accordance with a determination that the traffic size is larger than a threshold size and the urgency is higher than a threshold level, determine that a scheduling manner is an uplink multiple user multiple input multiple output (UL-MU-MIMO) scheduling manner, or
  in accordance with a determination that the traffic size is smaller than a threshold size and the urgency is higher than a threshold level, determine that a scheduling manner is an uplink orthogonal frequency division multiple access (UL-OFDMA) scheduling manner;
  send, to the STA, the uplink scheduling information; and
  receive, from the STA, uplink traffic using the uplink scheduling information.

15. The AP according to claim 14, wherein the memory further stores instructions to cause the at least one processor to:
  obtain a station type of the STA; and
  determine the type of uplink traffic based on the station type.

16. The AP according to claim 15, wherein instructions to determine the type of uplink traffic based on the station type comprise instructions to cause the at least one processor to:
  determine whether the station type is included in a predetermined set; and
  in accordance with a determination that the station type is included in the predetermined set, determine the type of uplink traffic based on an association between the station type and the type of uplink traffic; or
  in accordance with a determination that the station type is not included in the predetermined set, determine the type of uplink traffic from a plurality of types of uplink traffic of the STA.

17. The AP according to claim 14, further comprising instructions to cause the at least one processor to:
  determine further uplink scheduling information for a further STA based on historical information of the further STA, wherein the further uplink scheduling information indicates at least one of: a UL-OFDMA scheduling manner, a UL-MU-MIMO scheduling manner, or an uplink OFDMA random access (UORA) scheduling manner.

18. A non-transitory computer-readable medium comprising instructions stored thereon which, when executed by an access point (AP), cause the AP to:
  determine a type of uplink traffic from a station (STA), wherein the type of uplink traffic is associated with a traffic size and an urgency;
  determine, for the STA, uplink scheduling information based on the traffic size and the urgency, wherein determining the uplink scheduling information comprises:
  in accordance with a determination that the traffic size is larger than a threshold size and the urgency is higher than a threshold level, determine that a scheduling manner is an uplink multiple user multiple input multiple output (UL-MU-MIMO) scheduling manner, or
  in accordance with a determination that the traffic size is smaller than a threshold size and the urgency is higher than a threshold level, determine that a scheduling manner is an uplink orthogonal frequency division multiple access (UL-OFDMA) scheduling manner;
  send, to the STA, the uplink scheduling information; and
  receive, from the STA, uplink traffic using the uplink scheduling information.

* * * * *